(12) United States Patent
Inoue

(10) Patent No.: US 7,350,813 B2
(45) Date of Patent: Apr. 1, 2008

(54) STEERING COLUMN DEVICE

(75) Inventor: Koji Inoue, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/522,173

(22) PCT Filed: Jul. 25, 2003

(86) PCT No.: PCT/JP03/09436

§ 371 (c)(1),
(2), (4) Date: Jan. 24, 2005

(87) PCT Pub. No.: WO2004/011317

PCT Pub. Date: Feb. 5, 2004

(65) Prior Publication Data

US 2005/0242560 A1 Nov. 3, 2005

(30) Foreign Application Priority Data

Jul. 25, 2002 (JP) .............................. 2002-217010

(51) Int. Cl.
*B62D 1/18* (2006.01)
(52) U.S. Cl. ........................................ 280/775; 74/493
(58) Field of Classification Search ................ 280/775; 74/492, 493
See application file for complete search history.

(56) References Cited

U.S. PATENT DOCUMENTS

| 3,599,757 | A | * | 8/1971 | Takamatsu et al. ......... 188/371 |
| 5,992,263 | A | | 11/1999 | Bleuel et al. |
| 6,189,405 | B1 | * | 2/2001 | Yazane ........................ 74/493 |
| 6,371,519 | B1 | * | 4/2002 | Jurik et al. ................. 280/777 |
| 2002/0084644 | A1 | * | 7/2002 | Rinker et al. ............... 280/775 |
| 2003/0025315 | A1 | * | 2/2003 | Matsumiya .................. 280/775 |
| 2005/0167962 | A1 | * | 8/2005 | Sato et al. .................. 280/775 |
| 2005/0268739 | A1 | * | 12/2005 | Sato et al. .................... 74/492 |

FOREIGN PATENT DOCUMENTS

| CH | 687 816 | 2/1997 |
| DE | 196 29 246 A1 | 1/1998 |
| DE | 197 37 744 | 3/1999 |
| EP | 0 709 274 | 5/1996 |
| EP | 1 007 397 | 6/2000 |
| EP | 1 201 526 A2 | 5/2002 |
| EP | 1 553 002 A1 | 7/2005 |
| GB | 2 304 866 A | 3/2003 |

(Continued)

*Primary Examiner*—Paul N. Dickson
*Assistant Examiner*—Barry Gooden, Jr.
(74) *Attorney, Agent, or Firm*—Miles & Stockbridge P.C.

(57) ABSTRACT

A steering column apparatus comprising: a steering column provided with a body-side bracket mounted to a body strength member to have a pair of side plate portions opposed each other to be extended in a vertical direction, and a substantially cylindrical distance unit for supporting a steering shaft to be rotatable therein and having a pair of pressed and expanding portions formed to be expanded by plastic working to be pressed and supported by the side plate portions of the body-side bracket; and an adjusting mechanism capable of adjusting a position of the steering column with respect to the side plate portions of the body-side bracket within a predetermined range, wherein the steering column is formed with a reinforcement portion for enhancing the clamping rigidity of the distance unit with respect to the side plate portions.

20 Claims, 6 Drawing Sheets

FOREIGN PATENT DOCUMENTS

| | | |
|---|---|---|
| JP | 8-230692 | 9/1996 |
| JP | 8-276852 | 10/1996 |
| JP | 10-7003 | 1/1998 |
| JP | 2001-514121 | 9/2001 |
| WO | WO 99/11501 | 3/1999 |

* cited by examiner

STEERING COLUMN DEVICE

FIELD OF THE INVENTION

The present invention relates to a steering column for constituting a steering device for a car or the like, and more specifically, to a technology for enhancing the rigidity or the like of a column distance unit for fixing the steering column on the car body.

RELATED BACKGROUND ART

Since a steering apparatus of a vehicle is to be used (for steering) by many and unspecific drivers, it is desirable that the position of a steering wheel is adjustable in compliance with the physique or the posture of each driver. In order to satisfy such desire, a tilt adjusting mechanism or a telescopic adjusting mechanism is widely employed not only for passenger cars, but also for freight cars.

The tilt adjusting mechanism is a mechanism to adjust the position of a steering wheel in the up-and-down direction, and is constituted by a tilt pivot for rockably supporting a steering column and a tilt position fixing means for fixing the steering column at a desired position (rocking angle). On the other hand, the telescopic adjusting mechanism is a mechanism for adjusting the position of the steering wheel in the back-and-forth direction (the axial direction of the steering shaft), and is constituted by an expandable unit of a double tube type or the like to be used for expansion and/or contraction of the steering shaft and a telescopic position fixing means for fixing the steering shaft at a desired position (with an amount of expansion/contraction).

Hitherto, it is general that, as the tilt position fixing means, a distance bracket formed of a steel plate is connected to a steering column formed of a steel pipe by welding and this distance bracket is pressed to be fixed by a body-side bracket which is formed of a steel plate. However, with such an arrangement, the number of the constituent parts and that of the welding steps are increased, and moreover, variable inconveniences are inevitably caused by thermal distortion, etc., at the welding. As a result, it is proposed in Japanese Patent Application Laid-Open No. 10-7003 or the like (hereinafter called the prior art) a structure in which a distance unit for fixing the steering column on the body-side bracket is formed to be expanded by plastic working.

FIG. 7 is a perspective view showing a steering column of the prior art as a single unit, and FIG. 8 is a vertical cross-sectional view of a distance unit of a steering column supported by a body-side upper bracket in a steering column apparatus. This steering column 21 is formed of a steel pipe in a cylindrical form, and pressed portions 25, 27 are formed to be expanded in the lower portions of the distance unit 29 in FIG. 7 and FIG. 8. Pressed surfaces 51, 53 are formed on side surfaces of the pressed portions 25, 27, and a through hole 71, through which a tilt bolt 31 is inserted, is formed on each of the pressed surfaces 51, 53. In this steering column apparatus, a nut 33 advances to the tilt bolt 31 by thread-engagement therewith upon rotation of a tilt adjusting lever 35 which is disposed on a side surface of the body-side bracket 3, so as to compress and release the steering column 21 by the use of the body-side bracket 3. According to the steering column apparatus of the prior art, it is possible to reduce the number of the constituent parts and that of the welding steps to reduce the manufacturing cost, and at the same time, to prevent inconveniences which may be caused by the thermal distortion or the like at the welding.

However, the above-described steering column apparatus of the prior art has the following drawbacks. For example, when a driver fastens the tilt lever 35, the parts other than the pressed portions 25, 27 in the distance unit 29 (the upper and lower portions in FIG. 9) are flexed, so that the operative feeling becomes very bad and a secured fixing of the steering column 21 by the use of the body-side bracket 3 becomes unfeasible. Moreover, when the driver clamps the tilt lever 35 with a clamping force exceeding a predetermined value, the distance unit 29 may be flexed beyond the limit of its elasticity so as to be plastically deformed. Then, these inconveniences become conspicuous when the steering column is formed of a thin steel pipe, which results in an obstacle to reduction of the weight of the steering apparatus.

SUMMARY OF THE INVENTION

The present invention has been contrived taking the above circumstances into consideration, and an object thereof is to provide a steering column apparatus which can enhance the rigidity of a distance unit while reducing the number of the constituent parts as well as the manufacturing cost.

In order to solve the above problems, according to the present invention, there is provided a steering column apparatus comprising: a steering column provided with a body-side bracket mounted to a vehicle body strength member to have a pair of side plate portions facing each other to be extended in a vertical direction, and a substantially cylindrical distance unit for supporting a steering shaft to be rotatable therein and having a pair of pressed and expanding portions formed to be expanded by plastic working to be pressed and supported by the side plate portions of the body-side bracket; and an adjusting mechanism capable of adjusting a position of the steering column with respect to the side plate portions of the body-side bracket within a predetermined range, wherein the steering column is formed with a reinforcement portion for enhancing the clamping rigidity of the distance unit with respect to the side plate portions.

According to the steering column apparatus of the present invention, it is preferable that the reinforcement portion is formed by coupling the pressed and expanding portions together in at least one of an upper portion and a lower portion of the pressed and expanding portions.

According to the steering column apparatus of the present invention, it is preferable that the convex portion is comprised of a plurality of convex streaks and the concave portion is comprised of a plurality of concave streaks.

According to the steering column apparatus of the present invention, it is preferable that the steering column is adjustable at least in one of a tilting direction or a telescopic direction with respect to the body-side bracket.

According to the steering column apparatus of the present invention, it is preferable that the plastic working is performed by hydroforming.

According to the present invention, the rigidity of the entire distance unit is enhanced and deflection is difficult to be caused even when a great clamping force is applied on the pressed portion.

DETAILED DESCRIPTION OF THE PREFERRED EMBODIMENTS

Description will be made below on an embodiment of a steering column apparatus according to the present invention.

Figure 1:
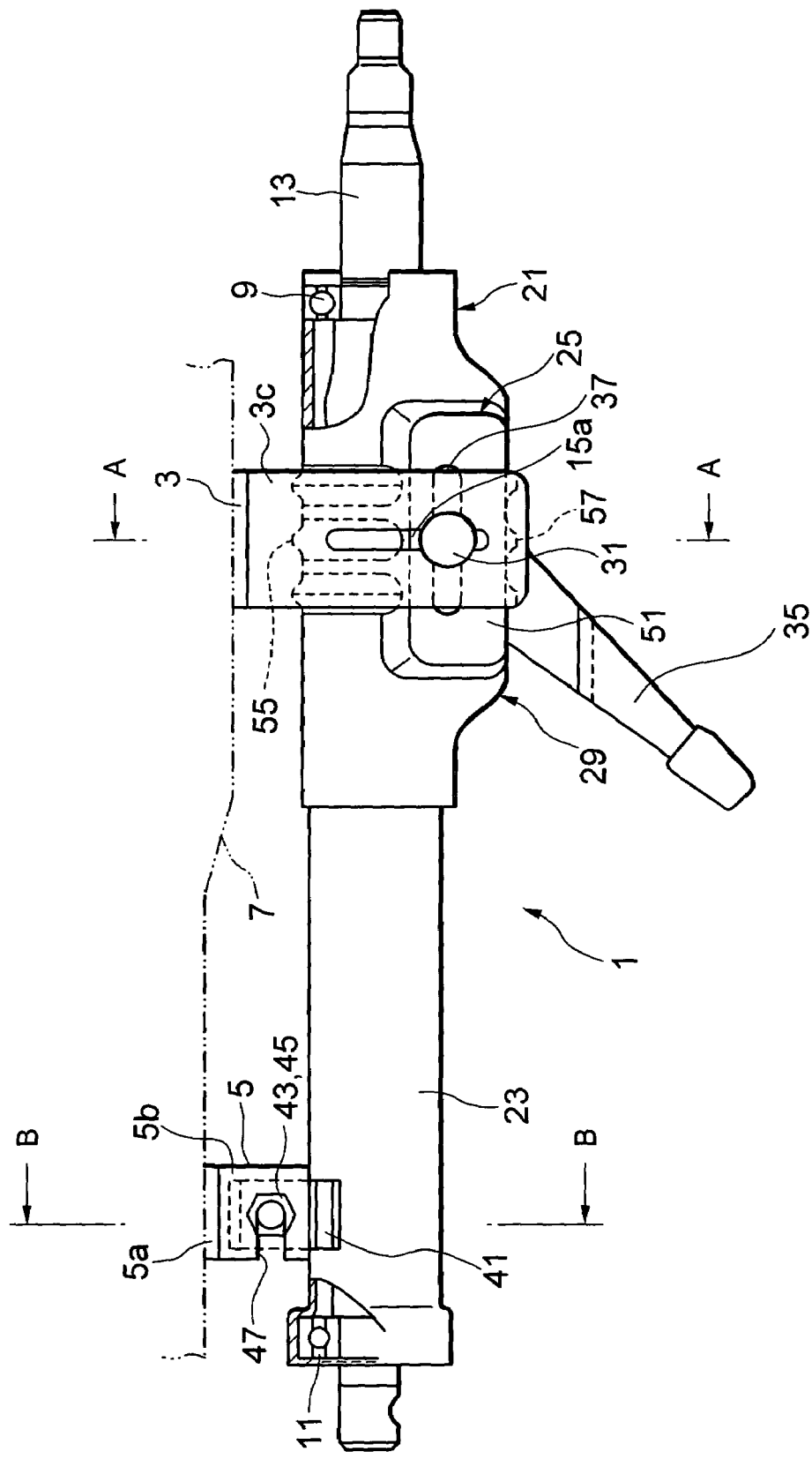
FIG. 1 is a side view of a steering column apparatus according to a first embodiment of the present invention.
Figure 2A:
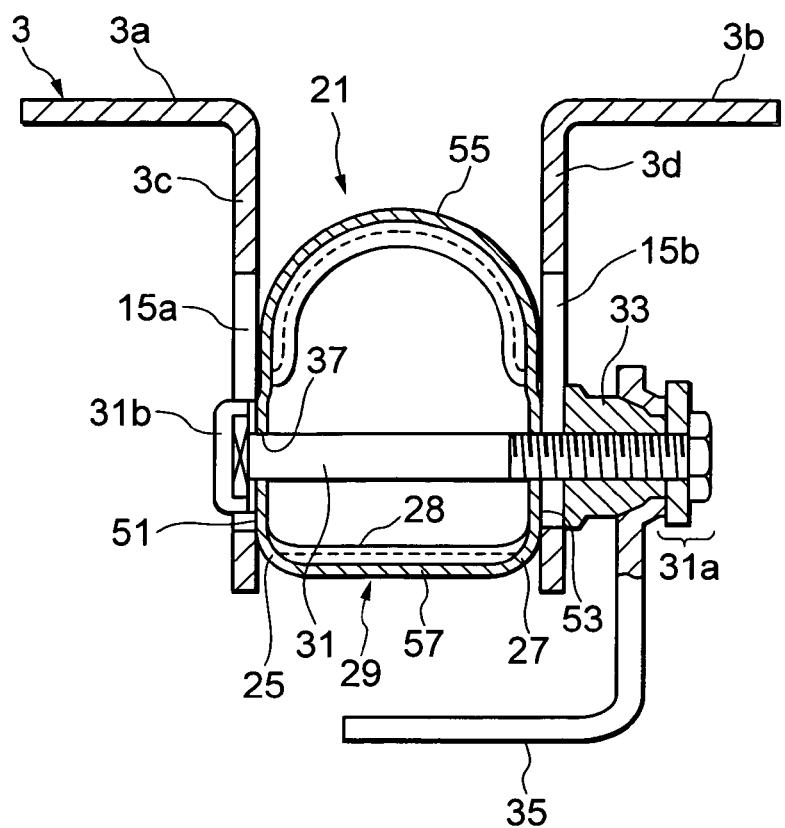
FIG. 2A is an enlarged cross-sectional view taken along A-A line in FIG. 1, leaving a steering shaft omitted.

FIG. 1 is a side view of a steering column apparatus according to the first embodiment of the present invention, and FIG. 2A is an enlarged cross-sectional view taken along A-A line in FIG. 1, provided that a steering shaft 13 is omitted in FIG. 1.

The steering column 1 is attached to a vehicle body-side strength member 7 through a fixed upper bracket 3 formed of a steel plate by press-forming to serve as a vehicle body-side bracket and a pivot bracket 5 formed of aluminium alloy by die casting, so as to support an upper steering shaft (hereinafter simply called the steering shaft) 13 to be rotatable through bearings 9, 11.

The upper bracket 3 has integrally a pair of body-side mounting portions 3a, 3b having the width in the length direction of the steering shaft, and being extended symmetrically in a direction perpendicular to an extending direction of the steering shaft, that is, the right-and-left direction in FIG. 2A, so as to be secured to the body-side strength member 7 by the use of fixing members (not shown) such as bolts, and a pair of side plate portions 3c, 3d which are bent substantially at right angles at the inner ends of body-side mounting portions 3a, 3b of the upper bracket 3 to be extended in vertical directions respectively.

While a steering wheel (not shown) is attached to an upper end of the steering shaft 13, a lower steering shaft is coupled to a lower end of the steering shaft 13 through a universal joint, which leads to a rack and pinion mechanism of a steering mechanism. Tilt adjusting holes 15a, 15b are formed on the side wall portions 3c, 3d of the upper bracket 3.

The steering column 1 is comprised of an upper column 21 formed of a steel pipe by hydroforming and a lower column 23 of a steel pipe fitted in the upper column 21 to be slidable. The upper column 21 is generally in the form of a cylinder, but is formed with a pair of right and left pressed and expanding portions 25, 27 in FIG. 2A to be pressed and sandwiched by the side plate portions 3c, 3d at the positions corresponding to these side plate portions 3c, 3d of the upper bracket 3 and a distance unit 29 whose bottom 28 is expanded and connect the expanding portions 25, 27 at the lower end. On flat surface portions 51, 53 of the expanding portions 25, 27, there are formed elongated holes 37, 37 respectively extending in the axial direction, corresponding to elongated holes 15a, 15b formed on the side plate portions 3c, 3d of the upper bracket 3. An adjusting bolt 31 is inserted through the elongated holes 15a, 15b and the elongated holes 37, 37, and the distance unit 29 is pressed and fixed with a predetermined clamping force to the fixed upper bracket 3 by the adjusting nut 33, as described later.

The adjusting nut 33 and an adjusting lever 35 are interposed between a nut 31a thread-engaged with the adjusting bolt 31 and secured thereto and one of the side plate portions 3d of the upper bracket 3. The adjusting nut 33 and the adjusting lever 35 are in a mutually integrated rotational relationship since a substantially conical projection of the adjusting nut 33 is fitted in a substantially conical recess of the adjusting lever 35. In addition, a thread portion of the adjusting bolt 31 is thread-engaged with a thread portion of the adjusting bolt 33.

A surface contacting with the side plate portion 3c of a head portion 31b of the adjusting bolt 31 has a cross-section in a substantially rectangular form, and is fitted in the elongated hole 15a formed on the side plate portion 3c of the upper bracket 3 to permit no rotation of the adjusting bolt 31.

The adjusting lever 35 is thus manually rotated to clamp the flat surface portions 51, 53 of the distance unit 29 by the side plate portions 3c, 3d or to release this clamping.

Such a clamping or releasing operation as described above may be performed by a known cam mechanism, instead of the adjusting nut 33.

The elongated holes 37, 37 formed on the flat surface portions 51, 53 of the column expanded portions 25, 27 and extended in parallel to the column shaft are used for adjusting the telescopic position of the steering column.

Figure 2B:
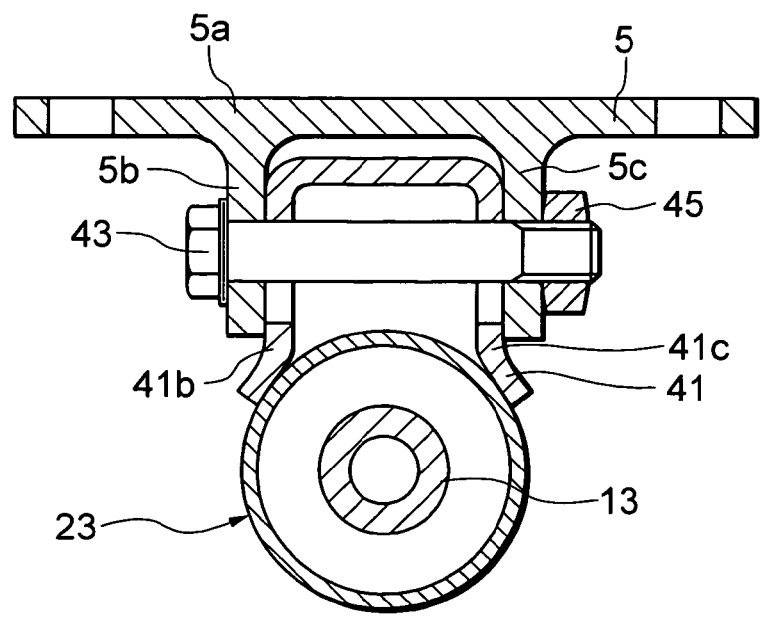
FIG. 2B is an enlarged cross-sectional view taken along B-B line in FIG. 1.

On the other hand, the pivot bracket 5a has a pair of body mounting portions 5a which are extended horizontally, as shown in FIG. 2B, and are secured to the body-side strength member 7 by bolts, or the like. A pair of vertical plate portions 5b, 5c which are extended in parallel in a vertical direction from the body mounting portions 5a are formed on the pivot bracket 5.

A column-side lower bracket 41 secured to a lower part of the lower column 23 integrally comprises flat plate portions 41b, 41c which are extended in the up-and-down direction, corresponding to the vertical plate portions 5b, 5c of the pivot bracket 5 and which are respectively in pressure contact therewith. The vertical plate portions 5b, 5c and the flat plate portions 41b, 41c of the column-side lower bracket are respectively formed with round holes arrayed in the horizontal direction, and the bolt 43 is inserted through these round holes to clamp those plate portions with the nut 45.

In the present embodiment, the column-side lower bracket 41 is formed by press-forming separately from the lower column 23, and is fixed to the lower column 23 by welding. However, the column-side lower bracket 41 may be integrally formed by expanding the lower column 23 by hydro-bulging or the like, in the same manner as the distance unit described above. A cut-away portion 47 in a substantially U shape is formed on the pivot bracket 5 to be open forward, and the pivot bolt 43 is inserted in the rear end side of the cut-away portion 47.

The steering column 1 is arranged to be rockable as a whole around the pivot bolt 43. The driver can adjust a vertical position of the steering wheel (in the up-and-down direction in FIG. 1) within a range in which the adjusting bolt 31 is moved in the tilt adjusting elongated holes 15a, 15b by operating the adjusting lever 35. Moreover, the upper column 21 is slidable with respect to the lower column 23, so that the driver can adjust the front and back positions of the steering wheel (in the right-and-left direction in FIG. 1) within a range in which the adjusting bolt 31 is moved in the elongated holes 37 for telescopic adjustment by operating the adjusting lever 35.

Figure 3:
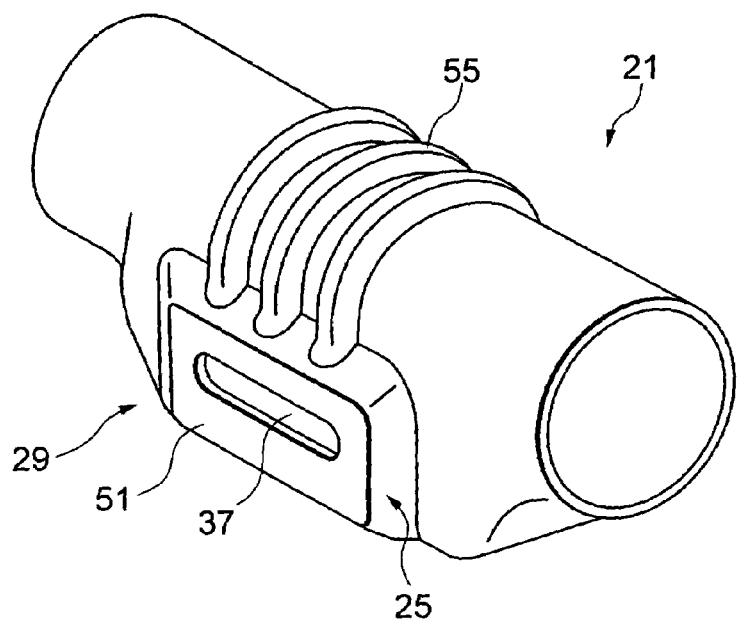
FIG. 3 is a perspective view of an upper column according to the first embodiment.
Figure 4:
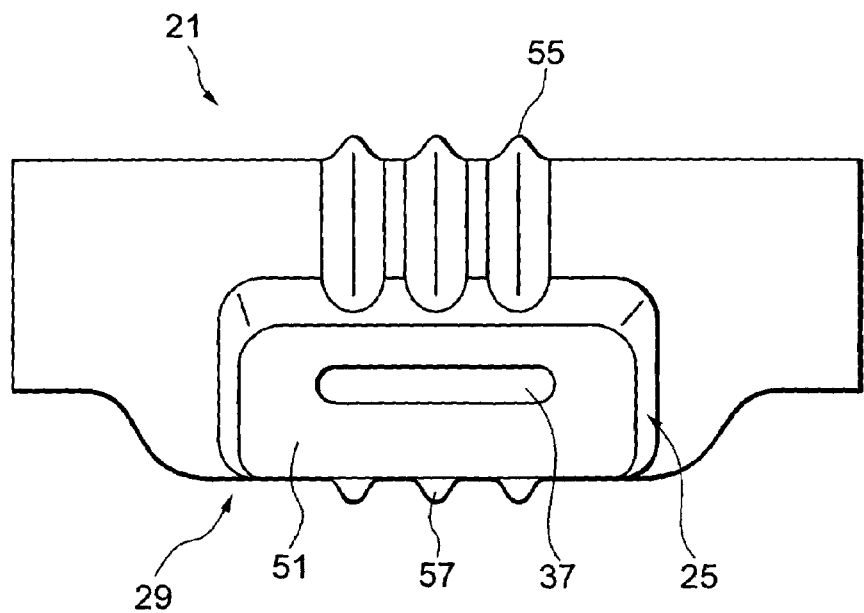
FIG. 4 is a side view of the upper column according to the first embodiment.

On the upper column 21 of the present embodiment, the pressed and expanding portions 25, 27 are formed with the flat surface portions 51, 53 which are brought into contact with the inner surfaces of the vertical side plate portions 3*c*, 3*d* of the fixed upper bracket 3, and three beads 55, 57 are formed, respectively, on an upper part and a lower part of the distance unit 29. FIG. 3 is a perspective view of this arrangement, while FIG. 4 shows a lateral view thereof. Each of the beads 55, 57 is formed at least along the length of the elongated hole 37 so as to couple the pressed portions 25, 27 together, thereby reinforcing the upper column. The number of such beads may be increased to meet a desired strength.

A mode of an operation of the present embodiment will be described in the following.

When the position of the steering wheel becomes inappropriate because of a change of drivers, or the like, with the steering column apparatus of the first embodiment, first the driver rotates the adjusting lever 35 clockwise to loosen the adjusting nut 33 with respect to the adjusting bolt 31. Then, the axial force of the adjusting bolt 31 which has worked on the distance unit 29 of the upper column 21 through the upper bracket 3 is extinguished so that the steering column 1 is allowed to rock in a predetermined amount which is determined by the elongated holes 15*a*, 15*b* around the pivot bolt 43 and, at the same time, the upper column 21 is also allowed to slide in a predetermined amount which is determined by the elongated holes 37, 37 with respect to the lower column 23. With this operation, the driver can tiltingly or telescopically move the steering column 1 to adjust the steering wheel to a desired position.

Upon completion of the positional adjustment of the steering wheel, the driver rotates the adjusting lever 35 counter-clockwise to clamp the adjusting nut 33 with respect to the adjusting bolt 31. Then, a predetermined axial force is generated in the adjusting bolt 31 so that the inner surfaces of the fixed upper bracket 3 are brought into pressure contact with the pressed flat surface portions 51, 53 of the distance unit 29. As a result, the upper column 21 (that is, the steering wheel) is fixed at a desired position with respect to the upper bracket 3.

On this occasion, since the beads 55, 57 for coupling the pressed and expanding portions 25, 27 are provided in an upper part and a lower part of the distance unit 29 in the present embodiment, the rigidity of the distance unit 29 is conspicuously high, compared with that of the prior art described above. With this structure, the upper column 21 can be supported by the fixed upper bracket 3 without fail, and a vibration of the steering shaft 13 and that of the steering wheel in running can be suppressed. In addition, an unintentional movement of the upper column 21 and the like at collision of the car is difficult to occur. If an excessive axial force is generated in the adjusting bolt 31 when the adjusting lever 35 is clamped by a strong clamping force, elastic or plastic deformation of the distance unit 29 is difficult to occur so that a stable clamping is feasible for a long time.

Figure 5:
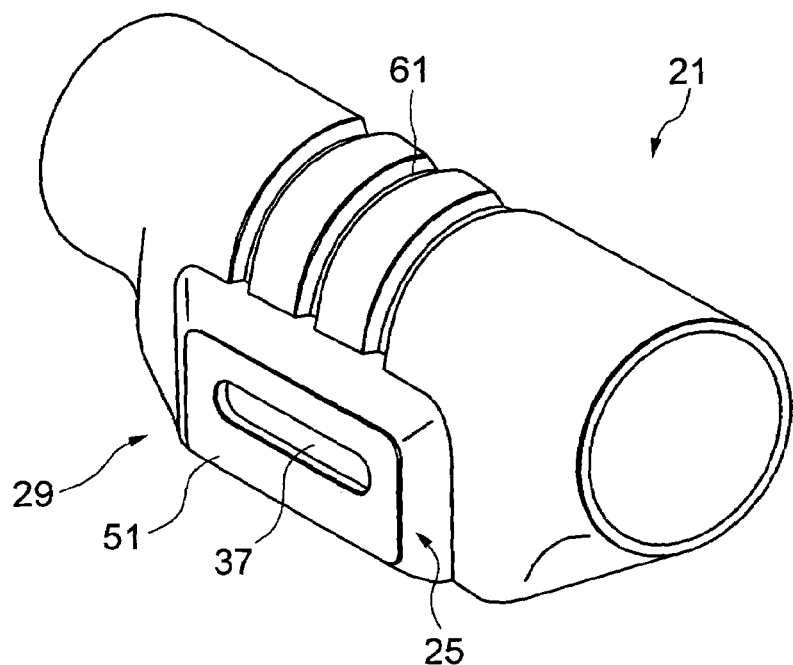
FIG. 5 is a perspective view of an upper column according to a second embodiment.
Figure 6:
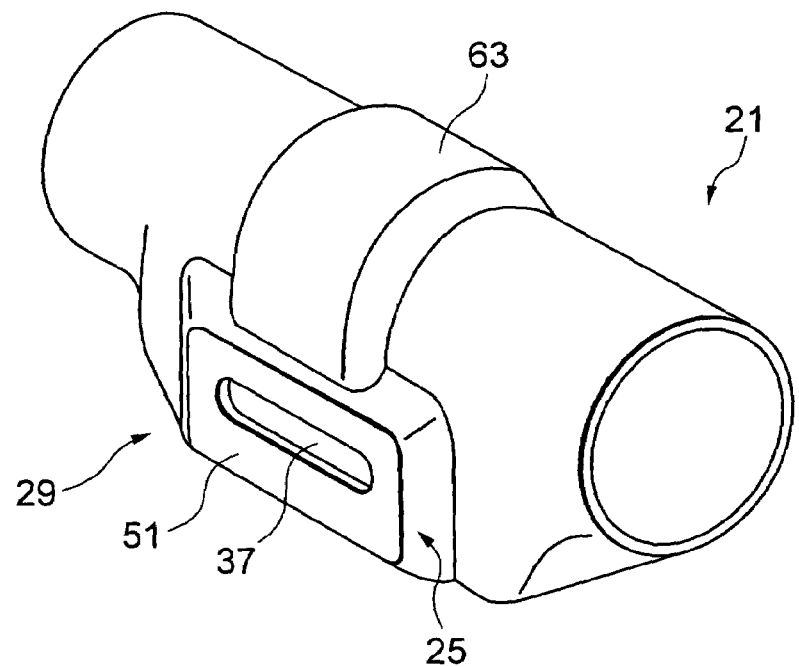
FIG. 6 is a perspective view of an upper column according to a third embodiment.
Figure 7:
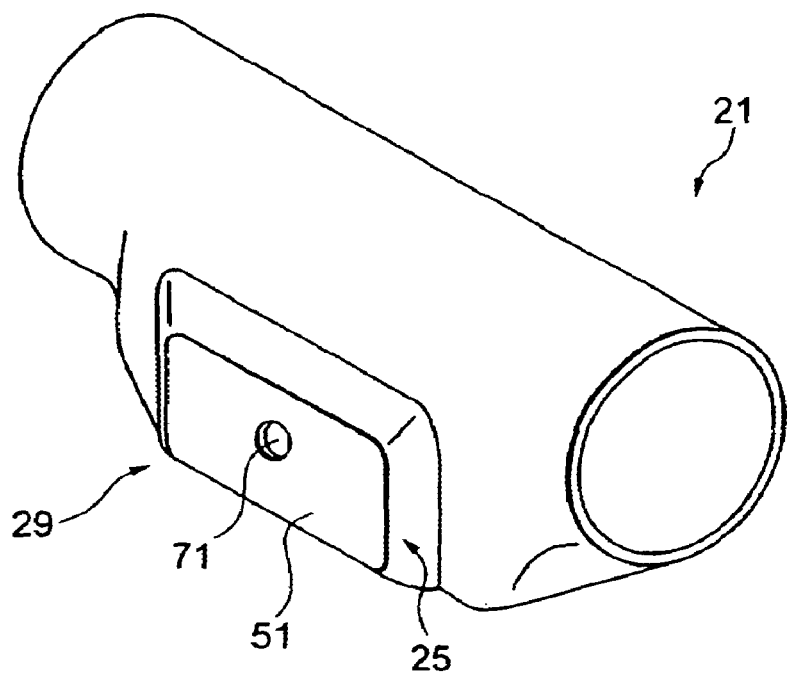
FIG. 7 is a perspective view of a steering column as a single unit according to the prior art.
Figure 8:
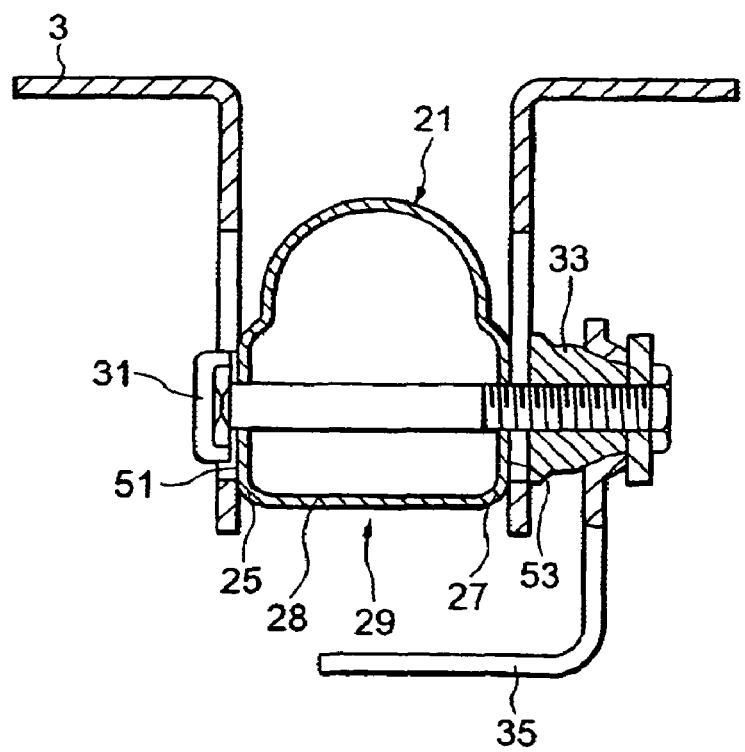
FIG. 8 is a longitudinal cross-sectional view of the distance unit of the steering column according to the prior art.
Figure 9:
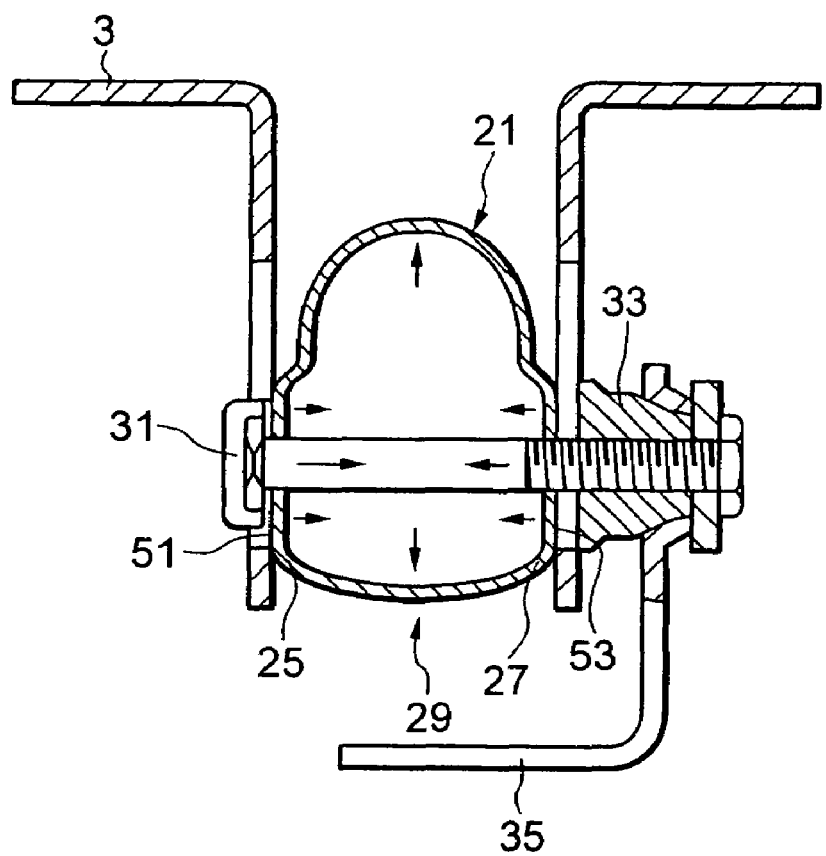
FIG. 9 is a longitudinal cross-sectional view for showing a variation of the distance unit of the steering column according to the prior art.

FIG. 5 is a perspective view of an upper column according to the second embodiment, and FIG. 6 is a perspective view of the upper column according to the third embodiment. Each of these embodiments employs a structure substantially the same as that of the first embodiment. However, in the second embodiment three grooves 61 depressed in the column are formed on the distance unit 29, instead of the beads. On the other hand, a wide R-shaped band type convex portion 63 is provided on the distance unit 29 in the third embodiment. These grooves 61 and the convex portion 63 are formed at least along the length of the elongated hole 37, in the similar manner as in the first embodiment, so as to connect the pressed and expanding portions 25, 27 and a mode of operation thereof is also the same as that in the first embodiment.

Embodiments of the present invention are not limited to those described above. For example, the size and the shape of a cross section of the convex portion or the concave portion for connecting the pressed and expanding portions, and the number or the pitch of these portions can be properly determined in accordance with designing reasons, or the like. These convex and concave portions may be provided on the upper side, on the lower side, or on the bottom of the pressed and expanding portions. The convex and concave portions may be properly combined with each other. The shape of a cross section of the bead may be substantially triangular, rectangular, or R-shaped. The material for the steering column may be steel pipe or alluminium. The steering column may be plastically processed by explosive bulging, rubber bulging, or press-forming, instead of hydroforming. In the embodiments described above, the present invention is applied to a steering column apparatus of a telescopic type. However, the present invention may be applied to a steering column apparatus which is provided only with a tilting mechanism or only with a telescopic mechanism. The described steering column comprises the upper column and the lower column which are separately formed. However, the upper column and the lower column may be integrally formed. Also, not only the distance unit, but also the lower bracket may be formed integrally. Specific structures of the steering apparatus and the material, the shape, and the like, of each of the constituent parts thereof can be properly changed within the scope and spirit of the present invention.

As described above, according to the steering column apparatus of the present invention, the rigidity of the whole column distance unit which is pressed and supported by the body-side bracket is improved and is difficult to be deflected even if a great clamping force is applied onto the pressed portion, the steering column can be supported by the body-side bracket without fail, a vibration of the steering shaft or that of the steering wheel in running can be suppressed, and an unintentional movement of the steering column or the like at a collision of the car scarcely occur.

What is claimed is:

1. A steering column apparatus comprising:

a vehicle body-side bracket mounted to a vehicle body member to have a pair of side plate portions opposed each other to be extended in a vertical direction;

a steering column for supporting a steering shaft to be rotatable therein, the steering column being formed with a distance unit expanded by hydroforming plastic working and having a pair of opposite side portions disposed to be clamped between said side plate portions of said body-side bracket to fix a position of said steering column; and an adjusting mechanism operable to clamp and release said opposite side portions of said distance unit with respect to said side plate portions of said body-side bracket to permit adjustment of the steering column position, wherein said steering column is formed with a reinforcement portion for enhancing clamping rigidity of said distance unit with respect to said side plate portions, said reinforcement portion couples said opposite side portions of said distance unit together in at least one of an upper part and lower part of said opposite side portions, and said reinforcement portion includes at least one convex streak or concave streak which couples said opposite side portions.

2. A steering column apparatus according to claim 1, wherein said steering column is adjustable at least in one of a tilting direction or a telescopic direction with respect to said body-side bracket.

3. A steering column apparatus according to claim 1, wherein said reinforcement portion couples said opposite side portions of said distance unit together in each of an upper part and a lower part of said opposite side portions, and said reinforcement portion includes for each of said upper part and said lower part of said opposite side portions, respectively, at least one convex streak or concave streak which couples said opposite side portions.

4. A steering column apparatus comprising:

a vehicle body-side bracket mounted to a vehicle body member and having a pair of side plate portions opposed each other;

a steering column having an expanded portion with a pair of opposite side portions disposed to be clamped between said side plate portions of the bodyside bracket to fix a position of said steering column; and an adjusting mechanism operable to clamp and release said opposite side portions of said expanded portion with respect to said side plate portions of the body-side bracket to permit adjustment of the steering column position, wherein an upper wall portion of the steering column between said opposite side portions of said expanded portion is formed with a reinforcement portion which enhances a clamping rigidity of said expanded portion with respect to said side plate portions of the body side bracket, said reinforcement portion includes a convex or concave band on said upper wall portion, and said band couples said opposite side portions of said expanded portion.

5. A steering column apparatus according to claim 4, wherein said reinforcement portion includes a plurality of said bands.

6. A steering column apparatus according to claim 4, wherein a further reinforcement portion is formed on a bottom wall of said expanded portion.

7. A steering column apparatus according to claim 4, wherein said steering column is adjustable at least in one of a tilting direction or a telescopic direction with respect to said body-side bracket.

8. A steering column apparatus according to claim 4, wherein said reinforcement band extends along a plane transverse to an axis of said steering column.

9. A steering column apparatus according to claim 6, wherein said further reinforcement portion includes a convex or concave band formed on said bottom wall so as to couple said opposite side portions of said expanded portion.

10. A steering column apparatus comprising:

a vehicle body-side bracket mounted to a vehicle body member and having a pair of side plate portions opposed each other;

a steering column having an expanded portion with a pair of opposite side portions disposed to be clamped between said side plate portions of the body-side bracket to fix a position of said steering column; and an adjusting mechanism operable to clamp and release said opposite side portions of said expanded portion with respect to said side plate portions of the body-side bracket to permit adjustment of the steering column position, wherein an upper wall portion of the steering column between said opposite side portions of said expanded portion is formed with a reinforcement portion which enhances a clamping rigidity of said expanded portion with respect to said side plate portions of the body side bracket, said upper wall portion of said steering column has an arch-shaped cross-section, and said reinforcement portion extends circumferentially of said upper wall portion.

11. A steering column apparatus according to claim 10, wherein said reinforcement portion includes a convex or concave band.

12. A steering column apparatus according to claim 11, wherein said band couples said opposite side portions of said expanded portion.

13. A steering column apparatus according to claim 12, wherein said reinforcement portion includes a plurality of said bands.

14. A steering column apparatus according to claim 11, wherein said reinforcement portion includes a plurality of said bands.

15. A steering column apparatus according to claim 10, wherein a further reinforcement portion is formed on a bottom wall of said expanded portion.

16. A steering column apparatus according to claim 15, wherein said further reinforcement portion includes a convex or concave band formed on said bottom wall so as to couple said opposite side portions of said expanded portion.

17. A steering column apparatus according to claim 10, wherein said steering column is adjustable at least in one of a tilting direction or a telescopic direction with respect to said body-side bracket.

18. A steering column apparatus according to claim 10, wherein said cross-section of said upper wall is arcuate.

19. A steering column apparatus according to claim 10, wherein said expanded portion is formed by hydroforming.

20. A steering column apparatus according to claim 10, wherein said reinforcement portion includes a convex or concave formation on said upper wall portion.

* * * * *